United States Patent
Lu et al.

(10) Patent No.: US 11,088,572 B2
(45) Date of Patent: Aug. 10, 2021

(54) DETACHABLE CHARGING PAD

(71) Applicants: DEXIN ELECTRONIC LTD., Guangdong (CN); DEXIN CORPORATION, New Taipei (TW)

(72) Inventors: Ho-Lung Lu, New Taipei (TW); Yuan-Jung Chang, New Taipei (TW)

(73) Assignees: DEXIN ELECTRONIC LTD., Guangdong (CN); DEXIN CORPORATION, New Taipei (TW)

(*) Notice: Subject to any disclaimer, the term of this patent is extended or adjusted under 35 U.S.C. 154(b) by 238 days.

(21) Appl. No.: 16/417,594

(22) Filed: May 20, 2019

(65) Prior Publication Data
US 2020/0161902 A1 May 21, 2020

(30) Foreign Application Priority Data
Nov. 16, 2018 (TW) .................................. 107140797

(51) Int. Cl.
*G06F 3/039* (2013.01)
*H02J 50/12* (2016.01)
*G06F 3/0354* (2013.01)
*H02J 7/02* (2016.01)

(52) U.S. Cl.
CPC ............ *H02J 50/12* (2016.02); *G06F 3/0395* (2013.01); *G06F 3/03543* (2013.01); *H02J 7/025* (2013.01)

(58) Field of Classification Search
CPC .......... H02J 50/12; H02J 7/025; H02J 50/005; G06F 3/0395; G06F 3/03543; G06F 2203/0384; G06F 3/039
See application file for complete search history.

(56) References Cited

U.S. PATENT DOCUMENTS

| | | | | |
|---|---|---|---|---|
| 6,633,155 B1* | 10/2003 | Liang | ...................... | H02J 50/12 320/166 |
| 8,207,906 B2* | 6/2012 | Tiscareno | ............... | H02J 50/10 343/906 |
| 2012/0177967 A1* | 7/2012 | Wang | ..................... | H01R 27/00 429/100 |
| 2015/0162781 A1* | 6/2015 | Fratti | ..................... | H02J 50/90 320/101 |
| 2015/0222142 A1* | 8/2015 | Shirai | ..................... | H02J 50/10 320/108 |
| 2015/0364943 A1* | 12/2015 | Vick | ........................ | H02J 50/10 320/108 |
| 2019/0036363 A1* | 1/2019 | Gaskin | ................... | H02J 7/0044 |

* cited by examiner

*Primary Examiner* — Nghia M Doan
(74) *Attorney, Agent, or Firm* — Li & Cai Intellectual Property Office

(57) ABSTRACT

A detachable charging pad includes a carrier and a control box. The carrier has a coil portion and a housing, and the housing has a first electrical connecting portion. The control box is detachably disposed in the housing. The control box has a control circuit and a second electrical connecting portion. When the control box is disposed in the housing, the first electrical connecting portion and the second electrical connecting portion are electrically in contact with each other. The control circuit outputs a control signal to the coil portion through the second electrical connecting portion and the first electrical connecting portion. The coil portion activates a wireless charging function according to the control signal. When the control box is not disposed in the housing, the coil portion stops the wireless charging function.

9 Claims, 4 Drawing Sheets

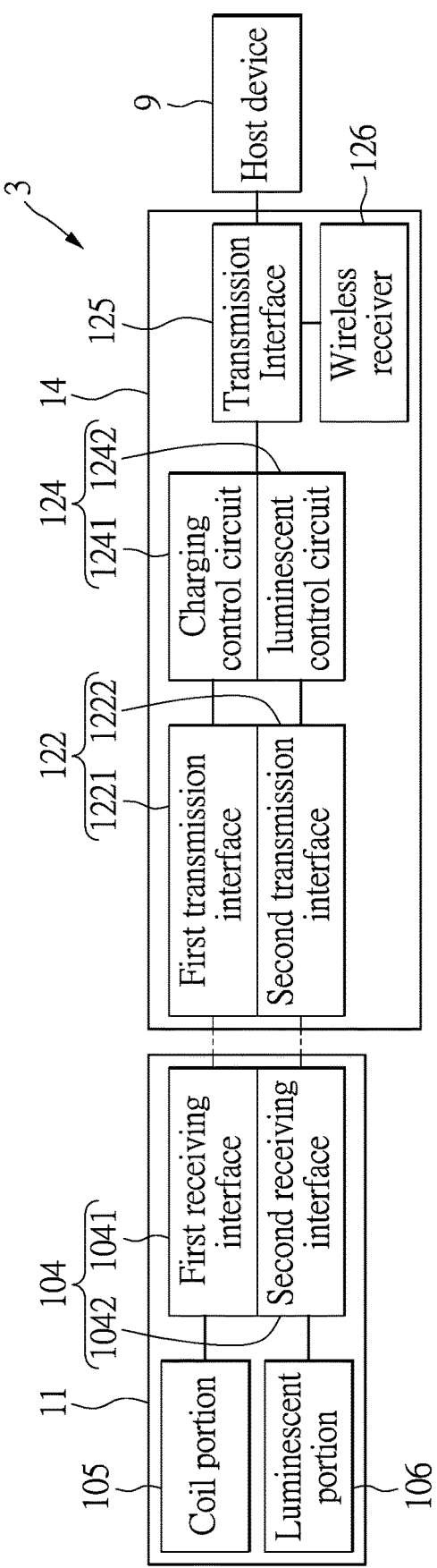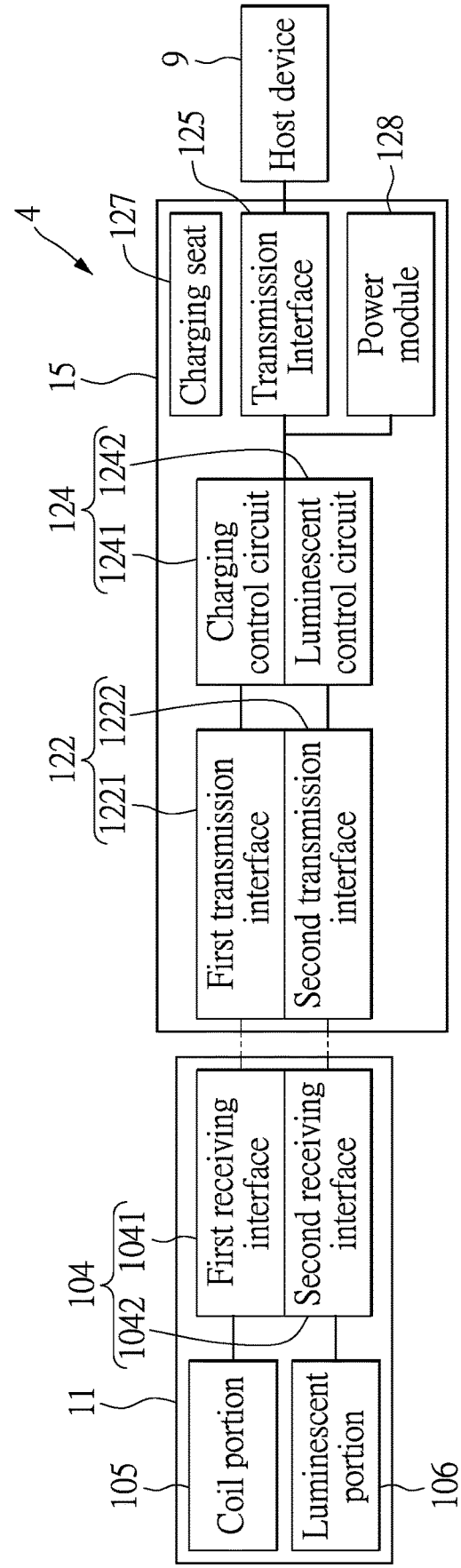

DETACHABLE CHARGING PAD

CROSS-REFERENCE TO RELATED PATENT APPLICATION

This application claims the benefit of priority to Taiwan Patent Application No. 107140797, filed on Nov. 16, 2018. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a charging pad, and more particularly to the charging pad which can provide a wireless charging function.

BACKGROUND OF THE DISCLOSURE

In order to support the use of wireless charging mice, conventional mouse boards also serve as charging pads. Therefore, a wireless mouse can be moved on the surface of a mouse board, and be charged by the charging pad via wireless charging at the same time. However, functions and operations of the conventional charging pads are too simple, and cannot be expanded by users.

SUMMARY OF THE DISCLOSURE

In response to the above-referenced technical inadequacies, the present disclosure provides a detachable charging pad.

In one aspect, the present disclosure provides a detachable charging pad, including: a carrier and a control box. The carrier has a coil portion and a housing and the housing has a first electrical connecting portion and the coil portion is electrically in contact with the first electrical connecting portion. The control box is detachably disposed in the housing. The control box has a control circuit and a second electrical connecting portion and the control circuit is electrically in contact with the second electrical connecting portion.

Specifically, when the control box is disposed in the housing and the first electrical connecting portion is electrically in contact with the second electrical connecting portion, the control circuit outputs a control signal to the coil portion through the second electrical connecting portion and the first electrical connecting portion so that the coil portion activates a wireless charging function according to the control signal outputted from the control circuit. When the control box is not disposed in the housing, the coil portion stops the wireless charging function.

To sum up, since the detachable charging pad provided by the present disclosure adopts a split design for the control box and carrier in the charging pad, users can determine whether to start a functional operation provided by the carrier by determining whether the control box is set in the housing or not. Therefore, the operations of charging pad can be more flexible.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings, in which:

FIG. 5 is a functional block diagram of a detachable charging pad according to another embodiment of the present disclosure; and FIG. 6 is a functional block diagram of a detachable charging pad according to another embodiment of the present disclosure.

DETAILED DESCRIPTION OF THE EXEMPLARY EMBODIMENTS

Figure 1:
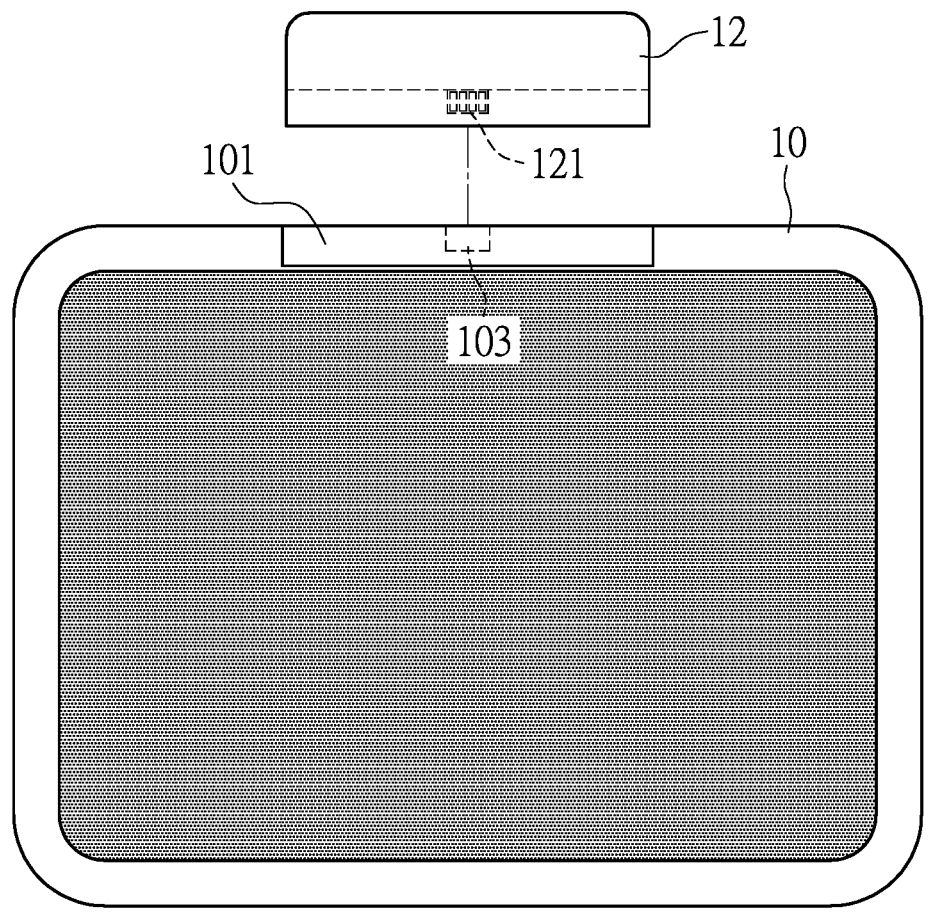
FIG. 1 illustrates a schematic diagram of a detachable charging pad before a separation according to an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

The embodiment of the present disclosure provides a detachable charging pad. Specifically, the detachable charging pad (hereinafter referred to as a charging pad) described herein is formed by a carrier and a control box using a split design, in which the split design indicates that the control box can be combined with or separated from the carrier. This charging pad provides a wireless charging function for wireless charging of an electronic device with a wireless charging function. The electronic device is, for example, a wireless peripheral or a mobile communication device.

In one embodiment, the carrier is provided with one or more different functions for use, but the carrier starts or activates a functional operation corresponding to a specific control box connected thereof. Further, when the control box is in contact with the carrier, the control box determines the corresponding function which the carrier can activate. When the control box is disconnected from the carrier, the functional operation of the carrier cannot be activated. Accordingly, users can determine the desired functional operation of the charging pad provided by the present disclosure according to the different carriers or control boxes in using.

Figure 2:
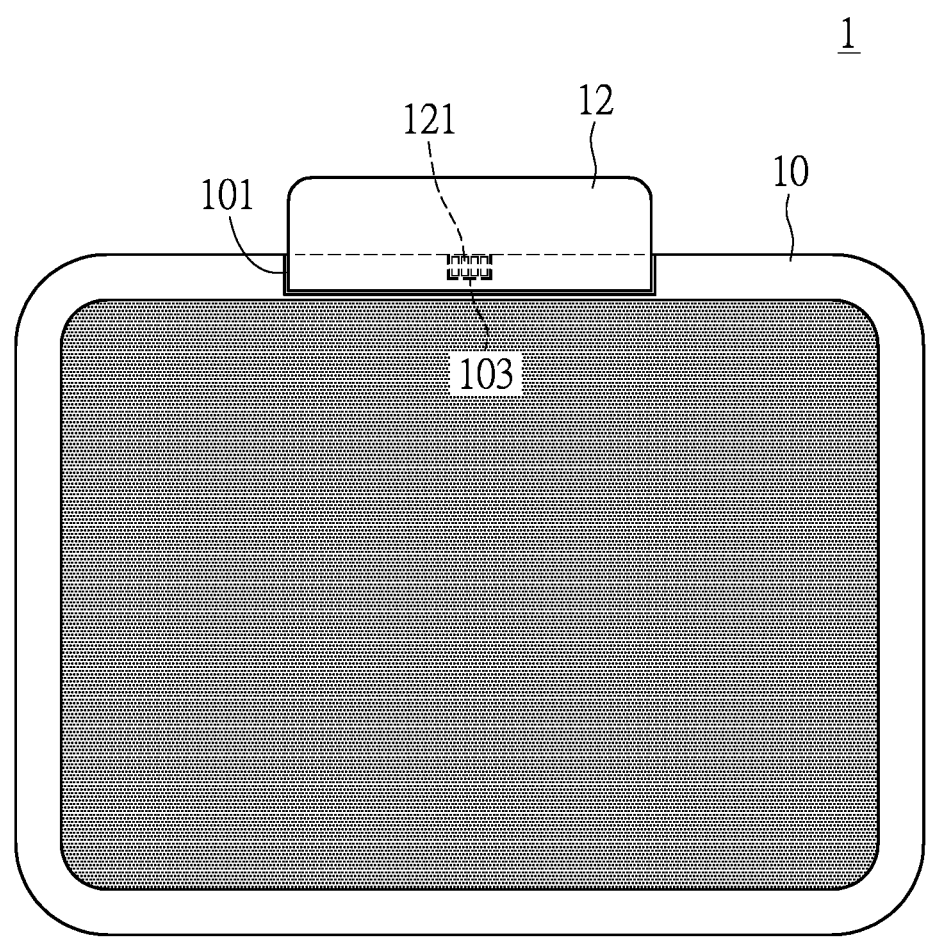
FIG. 2 illustrates a schematic diagram of a detachable charging pad after a combination according to the embodiment of the present disclosure.

Referring to FIG. 1 and FIG. 2, FIG. 1 illustrates a schematic diagram of a detachable charging pad before a separation provided by an embodiment of the present disclosure, and FIG. 2 illustrates a schematic diagram of the detachable charging pad after a combination provided by the embodiment of the present disclosure. A detachable charging pad 1 of this embodiment includes a carrier 10 and a control box 12, in which the carrier 10 has a housing 101 and a first electrical connecting portion 103 and the control box 12 has a second electrical connecting portion 121, the control box 12 can be set detachably disposed in the housing 101 and the first electrical connecting portion 103 of the carrier 10 can be electrically in contact with the second electrical connecting portion 121 of the control box 12 mutually.

In one embodiment, the functional operation of the carrier 10 is controlled by the control box 12. In addition, the carrier 10 can be a planar plate-body for a wireless peripheral device or a mobile communication device conducting a wireless charging on this plate-body, and the internal of the carrier 10 can be configured with corresponding electronic components according to requirements to provide different functional modules for operation.

As shown in FIG. 1, the control box 12 is separated from the carrier 10 and does not have any connection to the carrier 10. In the meanwhile, the functional operation of the carrier 10 will not be activated because the control box 12 is not connected to the control box 12.

Referring to FIG. 2, the control box 12 is set in the housing 101 of the carrier 10, and the second electrical connecting portion 121 of the control box 12 is electrically in contact with the first electrical connecting portion 103 of the carrier 10 mutually. Therefore, circuits in the control box 12 can output a control signal to the carrier 10 through the second electrical connecting portion 121 and the first electrical connecting portion 103, and the carrier 10 can activate operations according to the received control signal.

In one embodiment, the functional operation provided by the carrier 10 is, for example, a glowing function or a wireless charging function, but the present disclosure is not limited thereto, and other different functional modules inside the carrier 10 can also be provided for use. In addition, at least one of the glowing function and the wireless charging function of the carrier 10 can activated according to different control boxes 12 chosen to be disposed in the housing 101. For example, users can choose a first control box to start a single function of wireless charging for the carrier 10, or the user can choose a second control box to start a single function of glowing for the carrier 10. Alternatively, users can choose the third control box to start the glowing function and the wireless charging function for the carrier 10 simultaneously.

The first electrical connecting portion 103 and the second electrical connecting portion 121 can be, for example, connecting terminals or connectors, the present disclosure shall not be limited thereto. Besides, as long as the control box 12 is set in the housing 101 of the carrier 10 so that the first electrical connecting portion 103 and the second electrical connecting portion 121 can electrically contact with each other, the present disclosure will not limit the disposing positions and appearances of the first electrical connecting portion 103 and the second electrical connecting portion 121 present disclosure.

Figure 3:
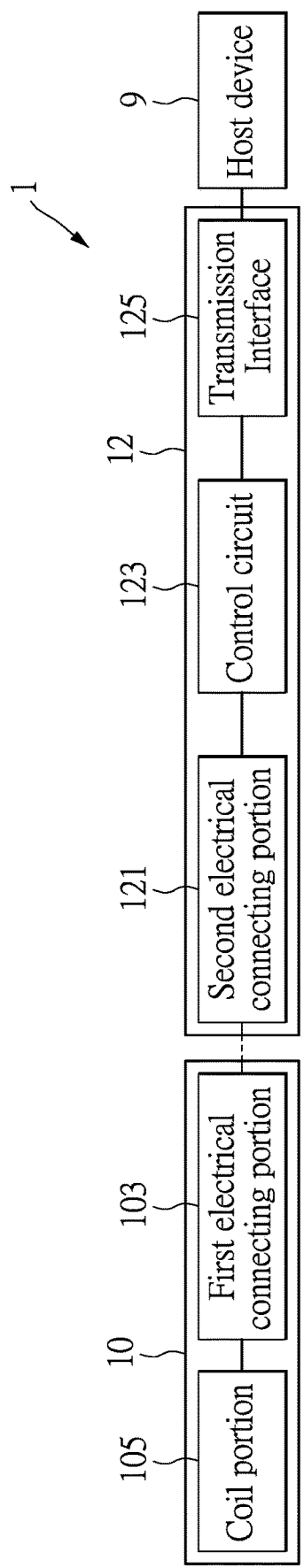
FIG. 3 illustrates a functional block diagram of a detachable charging pad according to the embodiment of the present disclosure.

FIG. 3 illustrates a functional block diagram of the detachable charging pad according to the embodiment of the present disclosure. The carrier 10 further includes a coil 105, and the control box 12 further includes a control circuit 123 and a transmission interface 125. The coil portion 105 is electrically in contact with the first electrical connecting portion 103. The control circuit 123 is electrically in contact with a second electrical connecting portion 121 and the transmission interface 125.

When the control box 12 is set in the housing 101 of the carrier 10, the second electrical connecting portion 121 is electrically in contact with the first electrical connecting portion 103 mutually, and the control circuit 123 outputs a control signal to the coil portion 105 through the second electrical connecting portion 121 and the first electrical connecting portion 103. Accordingly, the wireless charging function can be activated when the coil portion 105 obtains this control signal.

In addition, when the second electrical connecting portion 121 is not electrically in contact with the first electrical connecting portion 103, the coil portion 105 of the carrier 10 cannot obtain the control signal provided by the control box 12. Therefore, the coil portion 105 cannot activate the wireless charging function.

In one embodiment, regarding the wireless charging function provided by the charging pad 1, after a combination of the control box 12 and the carrier 10, by means of a joint operation of the control circuit 123 and the coil portion 105, the control circuit 123 and the coil portion 105 can be used as a wireless charging circuit. This wireless charging circuit is, for example, a wireless charging circuit that conforms to magnetic induction or Magnetic Resonance (MR), but the present disclosure is not limited thereto.

In addition, in one embodiment, the control circuit 123 obtains a power supply through the transmission interface 125. The control circuit 123 operates after obtaining this power supply. A transmission interface 125 is externally connected to a host device 9 to obtain power. The host device 9 can be any electronic device that provides power, such as a laptop device, a desktop computer device, or an audio and video player.

In addition, in one embodiment, the transmission interface 125 can also be directly connected to a power supplying device to obtain power, and this power supplying device, for example, can provide a power outlet that conforms to the use of the control circuit 123. The transmission interface 125 can be implemented for example as a universal serial bus connector or a universal serial bus hub, but the present disclosure shall not be limited thereto.

Figure 4:
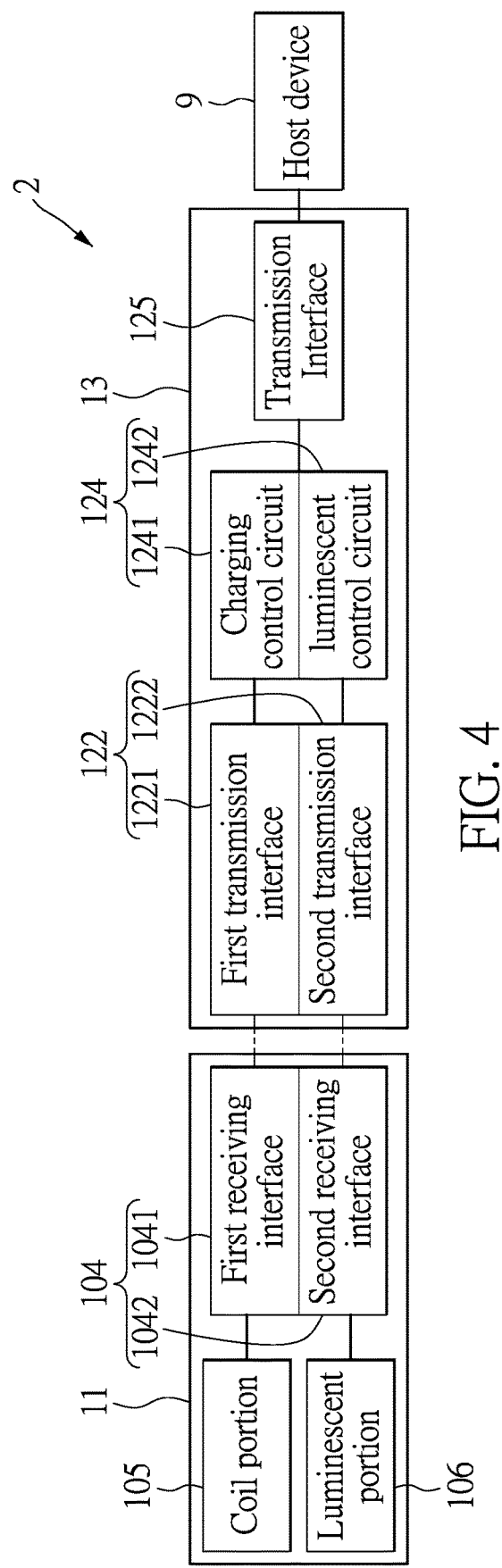
FIG. 4 illustrates a functional block diagram of a detachable charging pad according to another embodiment of the present disclosure.

FIG. 4 illustrates a functional block diagram of a detachable charging pad according to another embodiment of the present disclosure. The identical reference numerals of components in FIG. 4 are illustrated in the aforementioned embodiment and those are not repeated here. In this embodiment, a charging pad 2 and a control box 13 in a carrier 11 can additionally provide a functional operation of glowing compared with the above charging pad 1.

The carrier 11 is further configured with a luminescent portion 106. A first electrical connecting 104 of the carrier 11 further includes a first receiving interface 1041 and a second receiving interface 1042. The first receiving interface 1041 is electrically in contact with a coil 105, and the second receiving interface 1042 is electrically in contact with the luminescent portion 106.

The second electrical connecting portion 122 in the control box 13 further includes a first transmission interface 1221 and a second transmission interface 1222. A control circuit 124 includes a charging control circuit 1241 and a luminescent control circuit 1242. The charging control circuit 1241 is electrically in contact with the first transmission interface 1221, and the luminescent control circuit 1242 is electrically in contact with the second transmission interface 1222.

When the control box 13 is set in the housing of the carrier 11, the first electrical connecting portion 104 is electrically in contact with the second electrical connecting portion 122 mutually. The first transmission interface 1221 is only electrically in contact with the first receiving interface 1041 and the second transmission interface 1222 is only electrically in contact with the second receiving interface 1042. With an appropriate structural design for the control box 13 and the carrier 11, the first transmission interface 1221 will not be exposed to the second receiving interface 1042, and the second transmission interface 1222 will not be exposed to the first receiving interface 1041.

In one embodiment, the control signal outputted by the control circuit 124 for the carrier 11 further includes a wireless charging control signal and a glowing control signal. The charging control circuit 1241 outputs the wireless charging control signal to the coil portion 105 through the first transmission interface 1221 and the first receiving interface 1041, so that the coil portion 105 activates the wireless charging function according to the received wireless charging control signal. The wireless charging function cannot be activated when the coil portion 105 does not receive the wireless charging control signal.

In one embodiment, the luminescent control circuit 1242 outputs the glowing control signal to the luminescent portion 106 through the second transmission interface 1222 and the second receiving interface 1042, so that the luminescent portion 106 activates the luminescent function according to the received glowing control signal. When the luminescent portion 106 does not receive the glowing control signal, the luminescent function is not activated. The luminescent function can refer to any one or combinations of over-lit, flashing light and the color change of the light, but the present disclosure shall not be limited thereto. The luminescent portion 106 can be one or more luminescent components, such as a light-emitting diode. The luminescent portion 106 can be disposed around the periphery of the carrier as illustrated in FIG. 1, or at the location where the luminous change can be seen by another person, but the present disclosure shall not be limited thereto.

FIG. 5 is a functional block diagram of a detachable charging pad according to another embodiment of the present disclosure; and the identical reference numerals of components in FIG. 5 are illustrated in the aforementioned embodiment and those are not repeated here. In this embodiment, a control box 14 in a charging pad 3 is further configured with a wireless receiver 126 and the wireless receiver 126 is electrically in contact with a transmission interface 125. In one embodiment, the wireless receiver 126 can receive a wireless input signal transmitted by a wireless peripheral device and transmits the wireless input signal to a host device 9 through a transmission interface 125.

In a practical case, this wireless peripheral device may be a wireless charging mouse. When the control box 14 is set in the housing of the carrier 11 and the wireless charging mouse is operated on the charging pad 3, the charging pad 3 can wirelessly charge the wireless charging mouse. In the meantime, the charging pad 3 can receive the wireless input signal of the wireless charging mouse through the wireless receiver 126 wirelessly and transmit the wireless input signal to the host device 9 through the transmission interface 125, so that the host device 9 can control the movement of a cursor according to this wireless input signal.

FIG. 6 is a functional block diagram of a detachable charging pad according to another embodiment of the present disclosure; and the identical reference numerals of components in FIG. 6 are illustrated in the aforementioned embodiment and those are not repeated here. In this embodiment, a control box 15 in a charging pad 4 is further configured with a charging seat 127 and a power module 128, and the charging seat 127 and the power module 128 are electrically in contact with a transmission interface 127 and a control circuit 124.

The charging seat 127 can charge a wireless peripheral device. As the wireless peripheral device is placed in the charging seat 127, a conductive terminal in the charging seat 127 and a conductive terminal of the wireless peripheral device will be electrically exposed to each other. Therefore, the charging seat 127 can directly charge the wireless peripheral device through power obtained by the control circuit 124 or the transmission interface 127.

In one embodiment, the internal of the charging seat 127 can be further configured with a contact switch. As the wireless peripheral device is placed in the charging seat 127, this contact switch can be triggered to produce a trigger signal to a charging control circuit 1241. When the charging control circuit 1241 receives this trigger signal, it can be seen that the charging seat 127 is charging the wireless peripheral device. Therefore, the charging control circuit 1241 can further stop outputting a wireless charging control signal to a coil portion 105, in order to achieve the effect of power saving.

On the other hand, the power module 128 configured by the control box 15 can also provide a power supply to the control circuit 124. When a transmission interface 125 connects to the host device 9, the control circuit 124 can obtain the power supply from the transmission interface 125. When the transmission interface 125 does not connect to the host device 9, the control circuit 124 can obtain the power supply from the power module 128.

In one embodiment, the power module 128 can be a battery, a re-chargeable battery or a related power supplying circuit. When the power module 128 is a re-chargeable battery, a charging source can be obtained through the transmission interface 125, and the re-chargeable battery is charged through this charging source.

It is also noteworthy that the carriers and the control boxes in the above embodiments can be in different combinations according to respective demands, and the charging pad of the present disclosure shall not be limited by the above examples.

To sum up, the embodiments of the present disclosure provide a detachable charging pad, the carrier and control box in the charging pad encompass a separating design. The method of a separating design allows the user to determine the function of the charging pad to perform. By means of a selection of different combinations of control boxes and carriers, the present disclosure provides a variety of different functions for use. The charging pad of the present disclosure allows the user to flexibly choose the function to be performed according to the individual demand, and the operation for the charging pad is simple and friendly without any complicated setting.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching. The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A detachable charging pad, comprising:
   a carrier, having a coil portion and a housing, wherein the housing has a first electrical connecting portion and the coil portion is electrically in contact with the first electrical connecting portion; and
   a control box detachably disposed in the housing, wherein the control box has a control circuit and a second electrical connecting portion and the control circuit is electrically in contact with the second electrical connecting portion;
   wherein when the control box is disposed in the housing and the first electrical connecting portion is electrically in contact with the second electrical connecting portion, the control circuit outputs a control signal to the coil portion through the second electrical connecting portion and the first electrical connecting portion and the coil portion activates a wireless charging function according to the control signal outputted from the control circuit; and wherein when the control box is not disposed in the housing, the coil portion stops the wireless charging function;
   wherein the control box further includes a charging seat, and when a wireless peripheral device is placed in the charging seat, a contact switch of the charging seat is triggered to produce a trigger signal to the control circuit, the charging seat charges the wireless peripheral device, and the control circuit stops outputting the control signal to the coil portion.

2. The detachable charging pad as claimed in claim 1, wherein the carrier further includes a luminescent portion, and when the luminescent portion is electrically in contact with the first electrical connecting portion and the first electrical connecting portion is electrically in contact with the second electrical connecting, the luminescent portion glows according to the control signal.

3. The detachable charging pad as claimed in claim 2, wherein the first electrical connecting portion includes a first receiving interface and a second receiving interface and the first receiving interface is electrically in contact with the coil portion and the second receiving interface is electrically in contact with the luminescent portion, and wherein the second electrical connecting portion includes a first transmission interface and a second transmission interface, and both the first transmission interface and the second transmission interface are electrically in contact with the control circuit.

4. The detachable charging pad as claimed in claim 3, wherein the control circuit includes a charging control circuit and a luminescent control circuit, and when the charging control circuit is electrically in contact with the first transmission interface, the luminescent control circuit is electrically in contact with the second transmission interface, and when the control box is disposed in the housing, the first transmission interface is electrically in contact with the first receiving interface and the second transmission interface is electrically in contact with the second receiving interface so that the coil portion receives a wireless charging control signal provided by the charging control circuit and activates a wireless charging, and the luminescent portion receives a glowing control signal provided by the luminescent control circuit to activate luminescence.

5. The detachable charging pad as claimed in claim 1, wherein the control box further has a transmission interface, and the transmission interface is electrically in contact with the control circuit for the control circuit to obtain a power supply through the transmission interface.

6. The detachable charging pad as claimed in claim 5, wherein the transmission interface is a universal serial bus connector or a universal serial bus hub.

7. The detachable charging pad as claimed in claim 5, wherein the control box further includes a wireless receiver, the wireless receiver is electrically in contact with the transmission interface, the wireless receiver wirelessly receives a wireless input signal transmitted by the wireless peripheral device, and the wireless input signal is transmitted to a host device connected with the transmission interface.

8. The detachable charging pad as claimed in claim 5, wherein the charging seat is electrically in contact with the transmission interface.

9. The detachable charging pad as claimed in claim 5, wherein the control box further includes a power module, and the power module is electrically in contact with the control circuit and provides the power supply to the control circuit.

* * * * *